Patented July 4, 1950

2,513,614

UNITED STATES PATENT OFFICE 2,513,614

SEALING POROUS STRUCTURES

Raymond A. Barkhuff, Jr., Springfield, Mass., assignor to Monsanto Chemical Company, St. Louis, Mo., a corporation of Delaware No Drawing. Application January 18, 1947,
Serial No. 722,950

6 Claims. (Cl. 166—22)

This invention relates to a process for sealing subterranean passages. More particularly, this invention relates to a process for treatment of oil and gas wells so as to prevent the entrance of undesirable fluids into the well bore.

It is well known that wells which are drilled for the purpose of extracting oil from the earth are subject to a considerable loss of efficiency and quality of the product by virtue of the escape of undue amounts of gas or water into the well bore due to the porosity of the walls of the wells. Various means have been suggested for sealing off portions of the well bore in order to prevent the escape of such materials. However, such prior methods have been subject to such disadvantages as high cost, poor efficiency, lack of permanency, etc.

It is an object of this invention to provide a process for efficiently sealing selected portions of subterranean borings. A particular object is to provide a process for rendering porous formations in oil well borings impermeable to fluids such as water, oil and gas.

These and other objects are attained by causing a mixture of a liquid casting-type phenolformaldehyde resin containing 2–3 mols of combined formaldehyde for every mol of phenol and a phenol-formaldehyde-resorcinol resin, to penetrate the porous portions of subterranean passages which it is desired to seal and thereafter allowing the mixture to undergo condensation to the insoluble, infusible condition. It has been discovered that such a resin combination retains sufficient fluidity over the period of time required for insertion in well borings (which may be several thousand feet deep) to readily penetrate the porous earth structure and yet after penetration becomes insoluble and infusible at the temperatures there prevailing in a relatively short time.

The following examples are illustrative of the present invention, but are not to be construed as limitative thereof. Parts are parts by weight.

PREPARATION OF RESIN "A"

| | Parts |
|---|---|
| Phenol | 100 |
| Formalin (37% $CH_2O$) | 217 |
| Sodium hydroxide | 3 |
| Lactic acid (44% aqueous solution) | 15.3 |

The phenol, Formalin and sodium hydroxide are mixed in a suitable vessel equipped with a water-cooled return condenser and the resulting mixture is heated and stirred at 75° C. under sufficiently reduced pressure so that refluxing occurs. The heating and stirring are continued until the amount of formaldehyde in the reflux condensate is reduced to 1.8–2.1%. The lactic acid is then added and the acidified resin is dehydrated under an absolute pressure of 1–5 inches of mercury and at a temperature not exceeding 60° C. until the water content is reduced to about 9% (Fischer method). The viscosity is such that after the addition of 20 parts of ethanol to improve the storage stability of the resin, the product has a viscosity of 400–800 centipoises at 25° C.

PREPARATION OF RESIN "B"

| | Parts |
|---|---|
| Phenol | 100 |
| Formalin (37% $CH_2O$) | 258 |
| Sodium hydroxide | 5 |
| Lactic acid (44% aqueous solution) | 24 |

The phenol, Formalin and caustic soda are mixed in a suitable vessel equipped with a water-cooled return condenser and the resulting mixture is heated and stirred at 70° C. under sufficiently reduced pressure so that refluxing occurs. The heating and stirring are continued until the amount of formaldehyde in the reflux condensate is reduced to 3.5–4.0% by weight. The lactic acid is then added to neutralize the resin and produce a pH of about 5.5. The acidified resin is dehydrated under low absolute pressure, i. e., 1–5 inches of mercury, and at a temperature of not over 50–55° C. until the water content is reduced to about 9% (Fischer method). The resulting resin is stabilized for storage purposes by the addition of about 20 parts of ethanol and cooled to room temperature. A yield of about 230 parts of stabilized product is obtained which has a viscosity of about 1000 centipoises at 25° C.

PREPARATION OF RESIN "C"

| | Parts |
|---|---|
| Phenol | 100 |
| Formalin (37% $CH_2O$) | 110 |
| Hydrated lime | 3 |
| Resorcinol | 65 |

The phenol, Formalin and a slurry of the lime in 9 parts of water are mixed in a suitable vessel equipped with a water-cooled return condenser and the mixture heated and stirred at 30° C. under sufficiently reduced pressure to cause the mixture to reflux. The heating and stirring are continued until the product has a viscosity of 16–18 centipoises at 25° C., substantially all of the Formalin then being reacted. After cooling to about 60° C. the resorcinol is mercury and at a temperature of 44–45° C. until the product has a viscosity of 40–60 centipoises at 25° C. The mixture is then dehydrated under low absolute pressure, i. e., 1–5 inches of mercury and at a temperature of 45–55° C. until the water content is reduced to about 8.5% (Fischer method). The product is stabilized for storage purposes by the addition of 20 parts of ethanol and cooled to room temperature. A yield of about 215 parts of stabilized product is obtained which has a viscosity of about 1000 centipoises at 25° C.

PREPARATION OF RESIN "D"

| | Parts |
|---|---|
| Phenol | 100 |
| Formalin (37% CH$_2$O) | 100 |
| Barium hydrate | 21.2 |
| Water | 21.2 |
| Resorcinol | 50.0 |

The phenol, Formalin and barium hydrate (slurried in the water) are mixed in a suitable vessel equipped with a water-cooled return condenser and the resulting mixture heated at 75° C. under a sufficiently reduced pressure to cause the mixture to reflux. The heating is continued until the product has a viscosity of 14–17 centipoises at 25° C., substantially all of the formaldehyde then being reacted. The resorcinol is then added and the mixture is refluxed at 100° C. until the product has a viscosity of 40–60 centipoises at 25° C. The resin is then dehydrated at an absolute pressure of 1–5 inches of mercury and a temperature of 45–55° C. until the water content is reduced to about 8.5% (Fischer method). The product is stabilized for storage purposes by the addition of 20 parts of ethanol and then has a viscosity of about 800 centipoises at 25° C.

EXAMPLE I

A mixture of equal parts of stabilized Resin "B" and stabilized Resin "C" is prepared. To this mixture is added about 5% of hexamethylenetetramine, based on the weight of the mixture.

This product is admirably suited for sealing subterranean passages and, in particular, earth and rock formations penetrated by a well bore, as for example, oil and gas wells. The product has a sufficiently low viscosity at the temperatures prevailing in subterranean passages to readily penetrate porous formations frequently encountered in oil and gas wells and yet cures readily to an oil and water insoluble condition. For example, the product of this example after being brought to a temperature of 60° C. gels in about ½ hour and sets to a very hard, infusible, insoluble material in about 5–10 hours.

EXAMPLE II

A mixture of equal parts of stablized Resin "A" and stabilized Resin "C" is prepared. To this mixture is added about 10% of hexamethylenetetramine, based on the weight of the resin mixture. The resulting product, after being brought to a temperature of 60° C., gels in about 1½ hours.

Aside from a somewhat slower setting rate, the product of this example is similar in its characteristics to the product of Example I and is particularly useful in wells having elevated temperatures.

EXAMPLE III

Stabilized Resin "A" and stabilized Resin "D" are mixed in equal proportions by weight. An amount of paraformaldehyde to the extent of 4% by weight, based on the weight of the mixture, is added. The resulting product gels in about ¾ hour after being brought to a temperature of 60° C. and sets to an insoluble, infusible product in 8–12 hours.

This product is intermediate, in its rate of setting and hardening at moderately elevated temperatures such as prevail in oil and gas wells, between the products of Examples I and II.

Various methods may be employed in causing the resin mixture to penetrate the porous earth structure. The particular method employed will depend in part on the location of the structure to be sealed, i. e., it will depend upon whether the sealing is to be carried out at the bottom of the well or at a stratum midway between the top and bottom. When the sealing is to be carried out at an intermediate stratum, it is customary to block the portion of the well below such a stratum, for example, by filling the portion of the well below the stratum to be sealed with an inexpensive and relatively easily removed material, as for example, gravel, and then covering the gravel with an impermeable cap, e. g., a resin cap made by forcing a mixture of the sealant and a filler into the well bore on top of the gravel and allowing the resin to cure to the insoluble, infusible state. For this purpose, a 50—50 mixture by weight of the resin sealant of the invention and wood flour may be used. Thereafter, a resin sealer of the type described in the examples is introduced into the well and forced under hydraulic (e. g. oil or water) pressure into the porous structure. After the resin has hardened sufficiently, e. g., 3–4 hours for the product of Example I, the pressure is released and an additional amount of resin sealer is added, if necessary, in the same manner and allowed to set. Successive treatments of this type are carried out until the porous structure no longer absorbs further resin and the resin level is above the stratum to be sealed. Thereafter, the resin is allowed to harden for a period of about 24 hours, the excess resin in the well bore is drilled out and removed, together with the material inserted below the sealed stratum and the well is then ready for further use.

Sealing operations at the bottom of a well, for example, to prevent intrusion of water, are somewhat simpler in that there is no preliminary plugging of the lower portion of the bore. A sealing resin of the type set forth in the examples is delivered to the bottom of the well after removal of any mud or other extraneous materials that may be present and after sufficient resin has been inserted so that no further penetration occurs, the resin is allowed to stand until converted into the infusible, insoluble state.

Sealing resin of the invention, as exemplified by the examples has been successfully used to seal off strata several thousand feet below the surface of the earth and to plug the bottom of oil wells seven thousand or more feet deep.

The process of the invention has numerous unexpected and valuable advantages. For example, ample time is available for introducing the resin sealant into the wells or other subterranean passages, before the sealant begins to lose its penetrating qualities. On the other hand, the sealant sets in a relatively short period of time, to a sufficiently hard state so that a bailer or other device for measuring the depth to which the sealant has flowed and for introducing any additional sealant, may be supported on the resin mass without breaking the surface. Furthermore, the sealant sets to a hard state, resistant to water, oil and acid gases (e. g. H₂S) in 24 hours or less without the use of externally-applied heat at temperatures 85° F. or higher.

The sealant used in the process of the invention is also characterized by rapid and thorough penetration into fissured, cracked, porous and otherwise fluid permeable formations encountered in oil and gas wells. In addition, the sealant possesses excellent adhesion to rock strata and subterranean formations, even though such formations are coated with oil or brine films.

Another valuable characteristic resulting from the process of the invention is the lack of undue shrinkage of the hardened sealant. Thus, well borings which are treated according to the invention retain the increased efficiency for long periods of time and the sealed portions do not lose their effectiveness due to the development of fissures from excessive shrinkage of the sealant.

Numerous variations may be introduced into the preparation of the resin sealant used in the process of the invention. For example, the preparation of the casting type resin may be subject to many variations as is well-known to those skilled in the art of preparing casting resins.

Thus, the ratio of formaldehyde to phenol on a molar basis may vary from 2.0:1 to 3:1, or even higher, for example, 5:1, although when ratios higher than about 3:1 are used, the excess formaldehyde is not believed to enter into the usual reaction with phenol. Various alkalies may be used to catalyze the reaction. Usually, the nature and amount of alkaline material is such as to produce a pH of about 8.5—9.5. For this purpose, such alkalies as sodium hydroxide, potassium hydroxide, sodium carbonate, potassium carbonate, quaternary ammonium bases and the like may be used. As neutralizing acids, various weak acids of low volatility are suitable, particularly organic hydroxy acids such as lactic acid and glycollic acid, dicarboxylic acids such as phthalic acid, maleic acid, succinic acid, malic acid and mixtures of the foregoing acids.

Neutralization is usually effected before any substantial amount of condensation between phenol alcohols occurs as is evidenced by a rapid rise in viscosity of the reaction mixture. In terms of formaldehyde content of the reflux condensate, this point in the reaction will depend on the formaldehyde phenol ratio used. When a 3:1 molar ratio is used, the neutralization is preferably effected when the free formaldehyde content of the reflux condensate is reduced to 3-6%. When lower proportions of formaldehyde are used, neutralization is preferably effected after the free formaldehyde content has been reduced to somewhat lower values, for example, when a 2.5:1 formaldehyde-phenol molar ratio is used, the free formaldehyde is preferably reduced to 1.5-2.5% before the resin is neutralized and when a 2:1 formaldehyde-phenol molar ratio is used, the free formaldehyde is preferably reduced to not over 1.5% before the resin is neutralized.

The amount of neutralizing acid which is added is sufficient to reduce the pH to between 4.5 and 7 and preferably to between 5 and 6 to provide a stable resin.

The rate and extent of dehydration should be such that the product has a water content of 5–12%, preferably 8–10%, and after the addition of 20 parts of ethanol for every 100 parts of phenol originally present, a viscosity of not over 8000 and preferably, 200–1200 centipoises at 25° C.

In preparing the phenol-resorcinol-formaldehyde resin, the molar ratio of formaldehyde to phenol may be varied from about 1:1 to about 1.5:1. With respect to the amount of resorcinol incorporated in this resin, it is preferred that from 40–90 parts of resorcinol be used for every 100 parts of phenol. It is preferred that the addition of the resorcinol be delayed until substantially all of the formaldehyde is reacted with the phenol as is illustrated by the process described in making Resins "C" and "D." However, if desired, the addition of the resorcinol may be delayed until condensation of the phenol alcohols has partially taken place. However, it is preferred that the resorcinol be added prior to any substantial condensation between phenol alcohol molecules, as evidenced by a rapid increase in viscosity.

The extent of the reaction of the resorcinol prior to dehydration may be substantially varied. In the preparation of Resins "C" and "D," the reaction is shown as continued until the mixture has a viscosity of 40–60 centipoises. Other degrees of reaction may be effected, for example, until the reaction mixture has a viscosity of 25–100 centipoises at 25° C. However, it is desirable that the reaction prior to dehydration be continued at least until substantially all of the resorcinol has reacted.

In general, the extent of the reaction prior to dehydration should be so correlated with the extent of reaction during dehydration so that a product is obtained with a water content of 5–12% and, preferably, 8.5–9.5% and, after the addition of 20 parts of ethanol for every 100 parts of phenol originally present, a viscosity of not over 8000 centipoises and, preferably, 600–1200 centipoises at 25° C.

In place of the hydrated lime and barium hydrate used in the examples, other alkaline catalysts may be used in preparing the phenol-resorcinol-formaldehyde resin, as for example, sodium hydroxide, potassium hydroxide, the corresponding carbonates and the like. Metallic hydroxides in which the metals are from the alkali earth group represent a preferred class of catalysts. Usually not more than 10 parts of hydrated lime or a stoichiometrically equivalent amount of other alkaline catalysts are employed for every 100 parts of phenol.

The resin sealant may comprise various proportions of the two types of resin. However, it has been unexpectedly discovered that unexpectedly high rates of cure result if the proportion of the phenol resorcinol resin is such that the ratio of combined resorcinol to the total amount of combined phenol in the mixture of the two resins is not below about 25 parts or above about 45 parts of resorcinol for every 100 parts of phenol. This is clearly shown by the following table in which the effect of various proportions of Resins "B" and "C" on the gel time of mixtures thereof is set forth.

The gel times given in Table A are determined by placing 20 grams of the sealant in a test tube 6 inches long and 1 inch in diameter, adjusting the temperature of the tube and its contents to 30° C., immersing the tube and its contents in an oil (heavy mineral oil) bath at 70° C. to a point above the sealant level, stirring the sealant with a glass rod until its temperature reaches 70° C., and allowing the tube to stand without agitation until the sealant is sufficiently set to support the weight of the tube for 1–2 seconds when a glass rod immersed therein is slowly withdrawn. The gel time is the over-all time from immersion in the oil bath to the gel point.

*Table A*

| Stabilized Resin "B," parts | 70 | 60 | 50 | 40 | 30 |
|---|---|---|---|---|---|
| Stabilized Resin "C," parts | 30 | 40 | 50 | 60 | 70 |
| Per cent resorcinol (based on phenol) | 20.5 | 27.1 | 33.6 | 40.1 | 46.6 |
| Hexamethylenetetramine, parts | 5 | 5 | 5 | 5 | 5 |
| Gel time | 15'35" | 13'40" | 11'40" | 12'25" | 17'0" |

In contrast to the process of the invention, if Resin "C" is replaced by resorcinol per se in the same amount as is present in Resin "C," a substantially slower rate of cure occurs. This disadvantage is not rectified by the inclusion of additional formaldehyde along with the resorcinol.

In further contrast to the process of the invention, the mixture of Resins "B" and "C" cures at a far higher rate than does a mixture of 100 parts of Resin "C" and about 10 parts of hexamethylenetetramine. In other words, Resins "B" and "C" appear to represent a specific combination having an exceptionally high rate of cure and in which each component is critical as regards the rate of cure of the combination.

As shown in the examples, hexamethylenetetramine, paraformaldehyde, or other formaldehyde-generating agents such as trioxymethylene, etc., may be included in the resin sealant. Thus, it is desirable to include 2–10% of such an accelerating agent, based on the total amount of resin sealant, particularly if a stabilizer such as ethanol is present since it is desirable that the gel time of the sealant not exceed 15 minutes at 70° C.

As shown in the examples, the two resin components are stabilized by the incorporation of about 10% of ethanol therein. In place of ethanol, other stabilizers may be used, alkanols having 1–5 carbon atoms being preferred, i. e., methyl, ethyl, propyl, butyl and amyl alcohols, usually in the proportion of 2–20 parts for every 100 parts of the sum of the resin components.

The inclusion of a stabilizer is desirable when the sealant components are to be stored for a substantial period of time, e. g., several weeks and/or when it is desired that the viscosity of the sealant mixture be kept low during the sealing operations. On the other hand, if the resin components are to be combined and used within a few days, a stabilizer may be omitted, although it may still be advantageous to incorporate a stabilizer when the resins are mixed, to maintain a low viscosity during sealing operations.

For certain purposes, it may be desirable to extend the resin sealant of the invention with one or more fillers, such as wood flour, walnut shell flour, powdered silica, comminuted infusible phenol-aldehyde resin, barytes, etc. For example, 15–50% by weight based on the resin content of the sealant may be used.

The term "phenol" wherever it appears in the specification and claims, is used to designate phenol ($C_6H_5OH$) specifically and not phenols generically.

The resin mixtures of this invention are more specifically set forth and claimed in my copending application S. N. 722,951, filed January 18, 1947.

It is understood that the above description is given by way of illustration only, and not of limitation, and that deviations are possible within the spirit of the invention.

What is claimed is:

1. In a process for sealing a permeable stratum in a well bore, the steps which comprise introducing into the well bore a mixture of a liquid phenol-formaldehyde resin, a phenol-resorcinol-formaldehyde resin and from 2–10% of a formaldehyde-generating substance taken from the group consisting of hexamethylene tetramine, paraformaldehyde and trioxymethylene, said mixture containing said resins in such relative proportions as to produce a combined resorcinol-phenol ratio between 25:100 and 45:100, forcing said mixture into the permeable stratum and allowing the resin to cure to an infusible, insoluble state, said liquid phenol-formaldehyde resin containing 2–3 mols of combined formaldehyde for each mol of phenol and having been made under alkaline conditions and then acidified to a pH of 4.5–7, and said phenol-resorcinol-formaldehyde resin containing 1–1.5 mols of combined formaldehyde for each mol of phenol and 40–90 parts of combined resorcinol for every 100 parts of phenol and having been made by partially reacting phenol and formaldehyde under alkaline conditions, reacting resorcinol with the partial condensation product under alkaline conditions until a viscosity of 25–100 centipoises at 25° C. is attained and then dehydrating the phenol-resorcinol-formaldehyde condensation product to a water content of 5–12% and a viscosity of not over 8000 centipoises at 25° C., said viscosity being measured in a solution containing 20 parts of ethanol per 100 parts of phenol originally reacted.

2. In a process for sealing a permeable stratum in a well bore, the steps which comprise introducing into the well bore a mixture of 50 parts of a liquid phenol-formaldehyde resin, 50 parts of a phenol-resorcinol-formaldehyde resin and 5 parts of hexamethylene tetramine, said mixture containing said resins in such relative proportions as to produce a combined resorcinol-phenol ratio of 33.6:100, forcing said mixture into the permeable stratum and allowing the resin to cure to an infusible, insoluble state, said liquid phenol-formaldehyde resin having been made by reacting 2–3 mols of formaldehyde with 1 mol of phenol at a pH of 8.5–9.5 followed by acidification with lactic acid to a pH of 5–6 and said phenol-resorcinol-formaldehyde resin containing 1–1.5 mols of combined formaldehyde for each mol of phenol and 65 parts of combined resorcinol for every 100 parts of phenol and having been made by partially reacting phenol and formaldehyde in the presence of 3 parts of calcium hydroxide for every 100 parts of phenol, reacting the resorcinol with the partial condensation product in the presence of the said calcium hydroxide until a viscosity of 40–60 centipoises at 25° C. is attained, and then dehydrating the phenol-resorcinol-formaldehyde condensation product to a water content of 8.5–9.5% and a viscosity of 600–1200 centipoises at 25° C., said viscosity being measured in a solution containing 20 parts of ethanol for every 100 parts of phenol originally reacted.

3. A process as defined in claim 1, in which the phenol-formaldehyde resin is acidified with lactic acid, the phenol-rescorcinol-formaldehyde resin is made in the presence of an alkaline earth metal hydroxide and the formaldehyde-generating substance is hexamethylene tetramine.

4. A process as defined in claim 1, wherein the phenol-formaldehyde resin is acidified to a pH of 5-6 and the phenol-resorcinol-formaldehyde resin is made in the presence of 1-5 parts of calcium hydroxide for every 100 parts of phenol.

5. A process as defined in claim 2 wherein the resin mixture also contain 10 parts of an alkanol containing 1-5 carbon atoms for every 100 parts of resin.

6. A process as defined in claim 2 wherein the resin mixture also contains 10 parts of methanol for every 100 parts of resin.

RAYMOND A. BARKHUFF, Jr.

REFERENCES CITED

The following references are of record in the file of this patent:

UNITED STATES PATENTS

| Number | Name | Date |
|---|---|---|
| 2,274,297 | Irons et al. | Feb. 24, 1942 |
| 2,385,373 | Rhodes | Sept. 25, 1945 |
| 2,398,388 | Norton | Apr. 16, 1946 |
| 2,414,415 | Rhodes | Jan. 14, 1947 |
| 2,437,710 | Rhodes | Mar. 16, 1948 |

Certificate of Correction

Patent No. 2,513,614                                                              July 4, 1950

RAYMOND A. BARKHUFF, Jr.

It is hereby certified that errors appear in the printed specification of the above numbered patent requiring correction as follows:

Column 3, line 1, strike out "mercury and at a temperature of 44–45° C." and insert instead *added and the mixture heated at 80° C.;* and that the said Letters Patent should be read with these corrections therein that the same may conform to the record of the case in the Patent Office.

Signed and sealed this 26th day of September, A. D. 1950.

[SEAL]

THOMAS F. MURPHY,
*Assistant Commissioner of Patents.*